United States Patent
Ohba et al.

(10) Patent No.: US 6,609,316 B2
(45) Date of Patent: *Aug. 26, 2003

(54) NODE DEVICE AND PACKET TRANSFER METHOD USING PRIORITY IN PLURAL HIERARCHICAL LEVELS

(76) Inventors: Yoshihiro Ohba, c/o Intellectual Property Division, Toshiba Corporation, 1-1-1, Shibaura, Minato-ku, Tokyo (JP); Yoshimitsu Shimojo, c/o Intellectual Property Division, Toshiba Corporation, 1-1-1, Shibaura, Minato-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/232,387

(22) Filed: Sep. 3, 2002

(65) Prior Publication Data

US 2003/0002511 A1 Jan. 2, 2003

Related U.S. Application Data

(63) Continuation of application No. 09/193,846, filed on Nov. 18, 1998, now Pat. No. 6,501,760.

(30) Foreign Application Priority Data

Nov. 18, 1997 (JP) ............................................. 9-316846

(51) Int. Cl.[7] ................................................. H04L 12/56
(52) U.S. Cl. .................................. 37/395.42; 370/395.1
(58) Field of Search ............................. 370/389, 395.1, 370/395.42, 395.43, 400

(56) References Cited

U.S. PATENT DOCUMENTS

| | | | |
|---|---|---|---|
| 4,581,734 A | * | 4/1986 | Olson et al. |
| 5,208,805 A | * | 5/1993 | Ochiai |
| 5,940,390 A | | 8/1999 | Berl et al. |
| 6,018,515 A | * | 1/2000 | Sorber ........................ 370/229 |
| 6,084,879 A | * | 7/2000 | Berl et al. .................. 370/389 |
| 6,222,841 B1 | | 4/2001 | Taniguchi |
| 6,320,943 B1 | * | 11/2001 | Borland ................. 379/112.01 |
| 6,381,244 B1 | * | 4/2002 | Nishimura et al. ..... 370/395.21 |

OTHER PUBLICATIONS

Braden et al., "Resource ReSerVation Protocol (RSVP)," *Version 1 Functional Specification*, RFC 2205, pp. 1–112, (Sep. 1997).
Wroclawski, "Specification of the Controlled–Load Network Element Service," RFC 2211, pp. 1–19, (Sep. 1997).
Shenker et al., "Specification of Guaranteed Quality of Service," RFC 2212, pp. 1–20, (Sep. 1997).
Clark et al., "An Approach to Service Allocation in the Internet," pp. 1–32, (Jul. 1997).
Kilkki, "Simple Integrated Media Access (SIMA)," pp. 1–24, (Jun. 1997).

* cited by examiner

*Primary Examiner*—Ken Vanderpuye

(57) ABSTRACT

A packet transfer scheme that applies markings at different levels to packets while they are transferred from their source to destination, in which a marking information at one level will not be lost by a marking at another level is disclosed. A node device receives packets each having a plurality of regions into which priority information can be written, and then transmits each received packet to a next hop node by writing the priority information according to criteria of the own node into one region into which the own node is allowed to write the priority information among the plurality of regions contained in each packet, while maintaining the priority information in other regions as received.

4 Claims, 12 Drawing Sheets

| PRIORITY CLASS | PRIORITY BIT POSITION | |
|---|---|---|
| | 2 (DOMAIN LEVEL) | 1 (EDGE LEVEL) |
| 0 | Out | Out |
| 1 | Out | In |
| 2 | In | Out |
| 3 | In | In |

FIG.4

| PRIORITY BIT | | | | PACKET MARKING PRIORITY LEVEL (i) | REFERENCE RATE (m [i]) | TARGET RATE (r [i]) |
|---|---|---|---|---|---|---|
| INPUT | | OUTPUT | | | | |
| 2 | 1 | 2 | 1 | | | |
| ARBITRARY | Out | Out | Out | 0 | OUTPUT RATE OF BIT 1 = In | 0 |
| ARBITRARY | In | Out | In / Out | 1 | OUTPUT RATE OF BIT 1 = In | ELR |

FIG.5

| PRIORITY BIT | | | | PACKET MARKING PRIORITY LEVEL (i) | REFERENCE RATE (m [i]) | TARGET RATE (r [i]) |
|---|---|---|---|---|---|---|
| INPUT | | OUTPUT | | | | |
| 2 | 1 | 2 | 1 | | | |
| ARBITRARY | Out | Out | In / Out | 0 | OUTPUT RATE OF BIT 1 = In | ELR |
| ARBITRARY | In | Out | In / Out | 1 | OUTPUT RATE OF BIT 1 = In WITH RESPECT TO INPUT PACKETS WITH BIT 1 = In | ELR |

FIG.6

| PRIORITY BIT | | PACKET MARKING PRIORITY LEVEL (i) | REFERENCE RATE (m [i]) | TARGET RATE (r [i]) |
|---|---|---|---|---|
| INPUT | OUTPUT | | | |
| 2 | 1 | 2 | | |
| ARBITRARY | Out | Out | 0 | OUTPUT RATE OF BIT 2 = In | 0 |
| ARBITRARY | In | In / Out | 1 | OUTPUT RATE OF BIT 2 = In | DLR |

FIG.7

| PRIORITY BIT | | PACKET MARKING PRIORITY LEVEL (i) | REFERENCE RATE (m [i]) | TARGET RATE (r [i]) |
|---|---|---|---|---|
| INPUT | OUTPUT | | | |
| 2 | 1 | 2 | | |
| ARBITRARY | Out | In | 0 | OUTPUT RATE OF BIT 2 = In | ∞ |
| ARBITRARY | In | In / Out | 1 | OUTPUT RATE OF BIT 2 = In | DLR |

FIG.8

| PRIORITY BIT | | PACKET MARKING PRIORITY LEVEL (i) | REFERENCE RATE (m [i]) | TARGET RATE (r [i]) |
|---|---|---|---|---|
| INPUT 2 | OUTPUT 1 | 2 | | |
| ARBITRARY | Out | In / Out | 0 | OUTPUT RATE OF BIT 2 = In | DLR |
| ARBITRARY | In | In / Out | 1 | OUTPUT RATE OF BIT 2 = In WITH RESPECT TO INPUT PACKETS WITH BIT 1 = In | DLR |

FIG.9

| PRIORITY BIT | | PACKET MARKING PRIORITY LEVEL (i) | REFERENCE RATE (m [i]) | TARGET RATE (r [i]) |
|---|---|---|---|---|
| INPUT 2 | OUTPUT 1 | 2 | | |
| ARBITRARY | Out | In/ Out | 0 | OUTPUT RATE OF BIT 2 = In | DLR |
| ARBITRARY | In | In | 1 | OUTPUT RATE OF BIT 2 = In | ∞ |

FIG.10

| PRIORITY BIT | | PACKET MARKING PRIORITY LEVEL (i) | REFERENCE RATE (m [i]) | TARGET RATE (r [i]) |
|---|---|---|---|---|
| INPUT | OUTPUT | | | |
| 2 | 1 | 2 | | |
| Out | Out | In / Out | 0 | OUTPUT RATE OF BIT 2 = In | DLR |
| In | Out | In / Out | 1 | OUTPUT RATE OF BIT 2 = In WITH RESPECT TO INPUT PACKETS WITH BIT 1 = In OR BIT 2 = In | |
| Out | In | In / Out | 2 | OUTPUT RATE OF BIT 2 = In WITH RESPECT TO INPUT PACKETS WITH BIT 1 = In | |
| In | In | In / Out | 3 | OUTPUT RATE OF BIT 2 = In WITH RESPECT TO INPUT PACKETS WITH BIT 1 = BIT 2 = In | |

FIG.11

| PRIORITY BIT | | PACKET MARKING PRIORITY LEVEL (i) | REFERENCE RATE (m [i]) | TARGET RATE (r [i]) |
|---|---|---|---|---|
| INPUT | OUTPUT | | | |
| 2 | 1 | 2 | | |
| Out | Out | In / Out | 0 | OUTPUT RATE OF BIT 2 = In | DLR |
| In | Out | In / Out | 2 | OUTPUT RATE OF BIT 2 = In WITH RESPECT TO INPUT PACKETS WITH BIT 2 = In | |
| Out | In | In / Out | 1 | OUTPUT RATE OF BIT 2 = In WITH RESPECT TO INPUT PACKETS WITH BIT 1 = In OR BIT 2 = In | |
| In | In | In / Out | 3 | OUTPUT RATE OF BIT 2 = In WITH RESPECT TO INPUT PACKETS WITH BIT 1 = BIT 2 = In | |

FIG.12

| PRIORITY BIT | | PACKET MARKING PRIORITY LEVEL (i) | REFERENCE RATE (m [i]) | TARGET RATE (r [i]) |
|---|---|---|---|---|
| INPUT | OUTPUT | | | |
| 1 | 2 | 0 | OUTPUT RATE OF BIT 2 = In | ∞ |
| 2 | ARBITRARY | ARBITRARY | | |

FIG.16

| Version (4) | Header Len.(4) | Prec. (3) | TOS(5) | Total Length (16) | |
|---|---|---|---|---|---|
| Identification (16) | | | | Flags (4) | Fragment Offset (12) |
| Time to Live (8) | | Protocol (8) | | Header Checksum (16) | |
| Source Address (32) | | | | | |
| Destination Address (32) | | | | | |

FIG.17

| Version (4) | Traffic Class (8) | Flow Label (20) | |
|---|---|---|---|
| Payload Length (16) | | Next Header (8) | Hop Limit (8) |
| Source Address (128) | | | |
| Destination Address (128) | | | |

NODE DEVICE AND PACKET TRANSFER METHOD USING PRIORITY IN PLURAL HIERARCHICAL LEVELS

This application is a continuation of U. S. application Ser. No. 09/193,846 filed Nov. 18, 1998 now U.S. Pat. No. 6,501,760

BACKGROUND OF THE INVENTION

1. Field of the Invention

The present invention relates to a node device for transferring packets by attaching priority information, a node device for processing packets attached with priority information, and a packet transfer method using priority information attached to packets.

2. Description of the Background Art

A mechanism for guaranteeing QoS (Quality of Service) in IP (Internet Protocol) network has been proposed in a form of providing a constant QoS with respect to individual TCP/UDP session, based on an approach disclosed in R. Braden, L. Zhang, S. Berson. S. Herzog and S. Jamin, "Resource ReSerVation Protocol (RSVP)—Version I Functional Specification", Internet RFC 2205, September 1997; J. Wroclawski, "Specification of the Controlled-Load Network Element Service", Internet RFC 2211, September 1997; and S. Shenker, C. Partridge and R. Guerin, "Specification of Guaranteed Quality of Service", Internet RFC 2212, September 1997. However, this approach has been associated with a problem of scalability because it is necessary for each router of the network to maintain a state with respect to individual session so that it has been considered rather difficult to employ this approach in a large scale network.

Instead, there is a proposition of a framework called Differentiated Service (DS). The goal of DS is provide a mechanism in which the quality of service can be changed according to an amount of money paid by a user as simply as possible. At the data transfer level, a TOS (Type Of Service) field of the packet header is used in order to distinguish different QoSs, rather than having a state for each session in the network.

As for the priority bit to be used in the TOS field, there are a scheme for using just one bit as disclosed in D. Clark and J. Wroclawski, "An Approach to Service Allocation in the Internet", Internet Draft, draft-clark-diff-svc-alloc-00.txt, July 1997, and a scheme for using plural bits as disclosed in K. Kilkki, "Simple Integrated Media Access (SIMA)", Internet Draft, draft-kalevi-simple-media-access-01.txt, June 1997.

The basic scheme of DS is as follows. A subscribed rate is specified between a user and a network or between two neighboring management networks (domains), and packets are marked as high priority packets while the transmission rate is less than or equal to the subscribed rate, or as low priority packets when the transmission rate exceeds the subscribed rate, according to a relationship between the subscribed rate and the monitored packet transmission rate. Then, the high priority packets are handled with priority over the low priority packets within the network or domain so as to provide different QoSs. Here, the marking is done by attaching (writing) an information indicating the priority level to the packet.

In the present specification, the subscribed rate between a user and a network will be referred to as an edge level rate (ELR) and the subscribed rate between two neighboring domains will be referred to as a domain level rate (DLR).

FIG. 1 shows an exemplary network to which DS is applied. In FIG. 1, U1, U2 and U3 are users (user terminals or user networks), E1 and E2 are edge routers, B1, B2, B3, B4, B5 and B6 are domain border routers, and R1 is a relay router. FIG. 1 shows a case involving four domains A, B, C and D. For instance, a network managed by one ISP (Internet Service Provider) corresponds to one domain.

Suppose that users U1, U2 and U3 in the domain A have subscribed edge level rates (ELR) of 2 Mbps, 2 Mbps and 5 Mbps, respectively, with respect to the domain A. In FIG. 1, only the subscribed rate for one direction is indicated for the sake of simplicity but it is possible to have the subscribed rate for both directions. It is assumed that the user is allowed to carry out the marking of high/low priority levels with respect to transmission packets at will. The edge routers E1 and E2 measure the arrival rate of the transmission packets from the user, and marks those high priority packets that arrived at rate above the subscribed edge level rate as low priority ones.

Then, suppose that the domain level rate (DLR) of 5 Mbps has been subscribed for traffic passing from the domain A to the domain B, for example. In FIG. 1, only the subscribed rate for one direction is indicated for the sake of simplicity but it is possible to have the subscribed rate for both directions. The domain border router B2 measures the arrival rate of packets from the domain A, and marks those high priority packets that arrived from the domain border router B1 at rate above the DLR as low priority ones. Similarly, when the DLR of 2 Mbps has been subscribed for traffic passing from the domain B to the domain C, the domain border router B5 marks those high priority packets that arrived from the domain border router B3 at rate above the DLR as low priority ones. Also, when the DLR of 10 Mbps has been subscribed for traffic passing from the domain B to the domain D, the domain border router B6 marks those high priority packets that arrived from the domain border router B4 at rate above the DLR as low priority ones.

Now, consider the case of using only one bit of the priority bit in FIG. 1. In this case, both the edge routers and the domain border routers will rewrite the same priority bit at a time of marking.

When the receiving rate of the high priority packets is above the subscribed rate at the domain level, the high priority packets below the subscribed rate will be passed as they are while packets above the subscribed rate will be marked as low priority ones regardless of whether they are originally high priority ones or low priority ones.

Suppose now that the user U1 transmitted the high priority packets destined to a host in the domain C at the ELR value of 2 Mbps. Also suppose that no transmission packets other than those from the user U1 are flowing from the domain border router B3 to the domain border router B5. Then, if the total transmission rate of the high priority packets from the users U2 and U3 is less than or equal to 3 Mbps, all the high priority packets from the user U1 will be delivered to the domain C as they are.

However, if the users U2 and U3 also transmit the high priority packets to the domain D and the total transmission rate of the high priority packets from the users U2 and U3 exceeds 3 Mbps, a part of the high priority packets from the user U1 will be changed into the low priority packets. In this case, there is a problem in that these high priority packets from the user U1 which are changed into the low priority packets at the domain border router B2 will be handled as the low priority ones in the domain C as well even if the domain border router B5 of the domain C has enough margin to pass 2 Mbps of the high priority packets from the user U1.

This problem is also present in the case of using plural priority bits as long as the same plural bits are to be rewritten at both the edge level and the domain level similarly as in the case of using one priority bit.

SUMMARY OF THE INVENTION

It is therefore an object of the present invention to provide a mechanism for a packet transfer scheme that applies markings at different levels to packets while they are transferred from their source to destination, in which a marking information at one level will not be lost by a marking at another level.

In order to achieve this object, the present invention provides a plurality of regions to which the priority information can be attached in a packet in correspondence to the plural levels, such that a region corresponding to one level will not be rewritten by a node that carries out the marking at another level.

A node device according to the present invention is thus characterized by writing the priority information according to criteria of the own node into a region in a packet into which the own node is allowed to write the priority information among the plurality of regions to which the priority information can be written, and transmitting that packet to a next hop node while maintaining the priority information in the other regions as received.

For example, when this node device is an edge router for transferring packets from a user (user terminal or user network) to a network, this node device writes the priority information into a region corresponding to the edge level (which can be considered as a network level in the case of using only two hierarchical levels of a user level and a network level), according to a rate specified between the user and the network for instance, without rewriting the priority information in a region corresponding to the user level. In addition, when there are three hierarchical levels of a user level, an edge level and a domain level, this edge router may writes the priority information into a region corresponding to the domain level, according to a policy of a domain to which this edge router belongs for instance. Else, when there are three hierarchical levels of a user level, an edge level and a neighboring node level, this edge router may writes the priority information into a region corresponding to the neighboring node level, according to a rate specified between this edge router and a next hop node.

Also, when this node device is a domain border router for transferring packets from one domain to another domain, this node device writes the priority information into a region corresponding to the domain level, according to a rate specified between domains or a policy of one of the domains to which this domain border router is connected for instance, without rewriting the priority information in any existing regions corresponding to the user level and the edge level (which includes the case where a value to be written by this domain border router happens to be the same as a value written in the same region by a previous hop domain border router so that it is left unchanged). Note that when there is only one level of either the user level or the edge level besides the domain level (as in the case where the edge router is to rewrite a region corresponding to the user level and no region corresponding to the edge level is provided for example), the priority information in a region corresponding to that one existing level is not to be rewritten by this domain border router. Also, when the neighboring node level also exists, this domain border router may write the priority information into a region corresponding to the neighboring node level, according to a rate specified between this domain border router and a next hop node.

Also, when this node device is a device for transferring packets from a previous hop node to a next hop node and a region corresponding to the neighboring node level exists, this node device writes the priority information into a region corresponding to the neighboring node level, according to a rate specified between this node and the next hop node for instance, without rewriting the priority information in any existing regions corresponding to the user level, the edge level, and the domain level (which includes the case where a value to be written by this node device happens to be the same as a value written in the same region by a previous hop node so that it is left unchanged).

As such, according to the present invention, packets are transferred while the priority information corresponding to one level is rewritten by a node that carries out the marking at the same level but not by a node that carries out the marking at another level. Namely, while packets are transferred from a source to a destination, the priority information corresponding to the domain level for instance will be rewritten every time packets are transferred across a range in which the priority information of that level is valid (i.e., a border of that domain), and the priority information corresponding to the neighboring node level for instance will be rewritten every time packets are transferred across a range in which the priority information of that level is valid (i.e., a next hop node), while the priority information corresponding to the user level for instance will not be rewritten within a range in which the priority information of that level is valid (i.e., until packets are received by the user).

By utilizing such hierarchical priority information, each node through which packets pass can carry out a flexible priority control reflecting an intention of the user or a policy of the domain, as in the following examples.

One example of the priority control is the priority control at a time of attaching the priority information. Namely, a transmission unit of this node device can determine the priority information to be written by the own node according to the priority level specified by one or a combination of plural of the priority information written in a plurality of regions contained in the received packet.

At this point, the priority information to be written can be determined according to the priority level specified as described above such that an amount of communication resources to be used by selected packets, which are to be transmitted by writing the priority information indicating the high priority into a region to which the own node is allowed to attach the priority information, will approach an amount of communication resources allocated to a set of packets to which these selected packets belong. Here, the reference amount of communication resources should preferably be that which is allocated within a range in which the priority information attached by the own node is valid (such as within the domain, or between neighboring nodes).

Note that this provision of determining the priority information according to the allocated amount of communication resources is valid even in the case where the edge router transmits a received packet by rewriting the priority information in a region corresponding to the user level instead of maintaining it. In such a case, the reference amount of communication resources can be an amount of communication resources allocated between the user and the network.

In order to make the amount of communication resources to be used by a packet which is to be written as the high priority one by the own node approaching to the reference amount, there can be a case where that packet is written as the low priority one even when a referenced region (which can be a region to which the own node is allowed to write the priority information or a region to which the own node is not allowed to write the priority information) indicates the high priority (the case of having many high priority packets) as well as a case where that packet is written as the high priority one even when the referenced region indicates the low priority (the case of having few high priority packets). As described below, there are many possible variations regarding how to determine the priority level at a time of attaching the priority information according to referenced one or plural priority information, and regarding how to use the determined priority level in relation to the reference amount in determining the priority information to be attached.

Another example of the priority control is the priority control at a time of packet transfer. Namely, a node device (which by itself does not attach the priority information) on a transfer route of a packet transmitted by the above described node device which attaches the priority information can carry out the transfer processing for that packet (including packet discarding or delay control) according to the priority level specified by referring to one or plural of the plurality of regions in which the respective priority information is written in that packet as received. Here, in the case of carrying out the packet discarding, the controlling is made such that packets with higher priority level will be less likely to be discarded, and in the case of carrying out the delay control, the controlling is made such that packets with higher priority level will be delayed shorter.

Note that when the node device which attaches the priority information itself transmits (transfers) the received packet, this node device may carry out the priority control related to the packet transfer according to the priority information written in that received packet, or according to the priority information written by the own node, or else by using another mechanism unrelated to the priority information in the packet. Also, a way of determining the priority level at a time of attaching the priority information and a way of determining the priority level at a time of packet transfer may be the same or different.

Note also that each aspect of the present invention described herein as a feature of a node device can be also conceived as a feature of a packet transfer method or an article of manufacture storing programs for causing the computer to function as the node device or to execute steps of the packet transfer method.

Other features and advantages of the present invention will become apparent from the following description taken in conjunction with the accompanying drawings.

BRIEF DESCRIPTION OF THE DRAWINGS

FIG. 4 is a table for explaining the first exemplary manner of marking in the case of an edge router according to one embodiment of the present invention.

FIG. 5 is a table for explaining the second exemplary manner of marking in the case of an edge router according to one embodiment of the present invention.

FIG. 6 is a table for explaining the first exemplary manner of marking in the case of a domain border router according to one embodiment of the present invention.

FIG. 7 is a table for explaining the second exemplary manner of marking in the case of a domain border router according to one embodiment of the present invention.

FIG. 8 is a table for explaining the third exemplary manner of marking in the case of a domain border router according to one embodiment of the present invention.

FIG. 9 is a table for explaining the fourth exemplary manner of marking in the case of a domain border router according to one embodiment of the present invention.

FIG. 10 is a table for explaining the fifth exemplary manner of marking in the case of a domain border router according to one embodiment of the present invention.

FIG. 11 is a table for explaining the sixth exemplary manner of marking in the case of a domain border router according to one embodiment of the present invention.

FIG. 12 is a table for explaining the seventh exemplary manner of marking in the case of a domain border router according to one embodiment of the present invention.

FIG. 16 is a diagram showing an exemplary priority bit region allocation in an IPv4 packet according to one embodiment of the present invention.

FIG. 17 is a diagram showing an exemplary priority bit region allocation in an IPv6 packet according to one embodiment of the present invention.

DETAILED DESCRIPTION OF THE PREFERRED EMBODIMENTS

Figure 1:
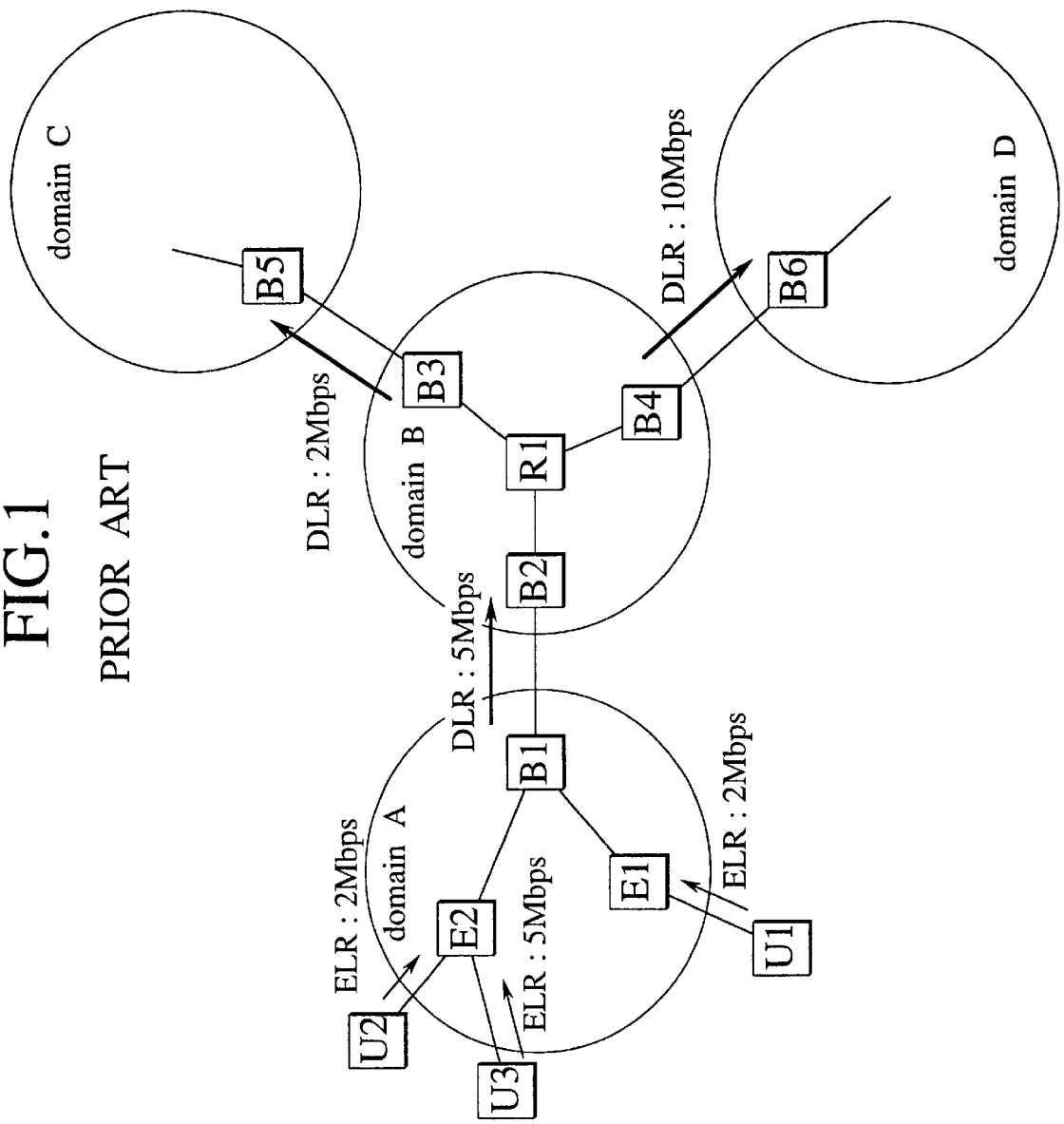
FIG. 1 is a diagram showing a network using a conventional differential service scheme.

Now, the preferred embodiments of the present invention will be described in detail. First, the main features of the present invention will be summarized.

A node device according to one embodiment of the present invention has a reception unit for receiving packets each containing a first priority information which is attached at a transmission node, a transmission network, or a management network managing the transmission node or the transmission network, and a transmission unit for attaching a second priority information to the received packet according to an amount of communication resources allocated to a flow to which the received packet belongs, and transmitting the packet that contains this second priority information and maintains the first priority information to a next hop node.

Here, the flow is a set of packets that are identified by some information contained in the packets, which corresponds to a set of packets having the same destination network, a set of packets having the same egress node in a domain to which this node device belongs, a set of packets having the same ingress node in a next hop domain of a domain to which this node device belongs, a set of packets having the same node as a next hop of this node device, a set of packets having the same destination network and source network, a set of packets having the same destination host, a set of packets having the same destination host and source host, a set of packets having the same destination host and destination port, a set of packets having the same destination host, destination port, source host and source port, or variations of these, for example. A type of set of packets that is to be treated as the flow may be different at different nodes.

Also, the amount of communication resources corresponds to a bandwidth or a transmission rate (which can be any of a peak rate, an average rate, etc.), for example. The allocation of communication resources may be made according to communication resources of physical communication links, or according to a subscription between a user and a domain, a subscription between domains, a subscription between neighboring nodes, etc., or else dynamically according to a report from the transmitting side or a request from the receiving side. In the case of making the allocation with respect to each flow at the finer granularity than what is specified by the physical link or the subscription, the allocation may be made manually by a network manager in view of an amount of traffic of each flow, or an amount of communication resources to be allocated to each flow may be determined by a node according to the control information exchanged by nodes. It is also possible to carry out the admission control for a report from the transmitting side or a request from the receiving side.

The transmission unit of this node device should preferably refer to the first priority information contained in the received packet and attach the second priority information indicating the high priority to those packets in which the first priority information indicates the high priority, at a higher priority over those packets in which the first priority information indicates the low priority.

In addition, it is also possible to attach the second priority information indicating the high priority even to those packets in which the first priority information indicates the low priority, within a range in accordance with the allocated amount of communication resources.

Here, the range in accordance with the allocated amount of communication resources may be set such that the second priority information indicating the high priority will be attached as long as a total number of packets to which the second priority information indicating the high priority does not exceed the allocated amount of communication resources, or such that the second priority information indicating the high priority will be attached to those packets in which the first priority information indicates the low priority as long as a total number of packets to which the second priority information indicating the high priority does not exceed a prescribed value less than the allocated amount of communication resources so as to account for a possibility for having bursty arrival of packets with the first priority information indicating the high priority later on.

Then, when the received packet exceeds a range in accordance with the allocated amount of communication resources upon receiving a packet with the first priority information indicating the high priority within a prescribed period of time after the second priority information indicating the high priority is attached to a packet with the first priority information indicating the low priority, the second priority information indicating the high priority may be attached to the received packet up to a prescribed range beyond the range in accordance with the allocated amount of communication resources. In addition, upon receiving a packet with the first priority information indicating the low priority within a prescribed period of time after that, the second priority information indicating the low priority may be attached to the received packet until a part that exceeded the range in accordance with the allocated amount of communication resources is compensated even if that received packet is within the range in accordance with the allocated amount of communication resources.

These are examples of the case for using the first priority information as the priority level at a time of attaching the priority information, which are also examples of a way of using this priority level in relation to the allocated amount of communication resources in determining the second priority information to be attached.

A node device according to another embodiment of the present invention has a reception unit for receiving packets each containing a first priority information which is attached at a transmission node, a transmission network, or a management network managing the transmission node or the transmission network, and a transmission unit for transmitting to a next hop node a packet to which a second priority information indicating a high priority is attached and in which the received first priority information is contained as it is when the first priority information contained in the received packet indicates the high priority, or for transmitting to the next hop node a packet to which the second priority information is attached according to an amount of communication resources allocated to a flow to which that packet belongs and in which the received first priority information is contained as it is when the first priority information contained in the received packet indicates the low priority.

This is another example of a way in which the first priority information is used as the priority level at a time of attaching the priority information and a way in which this priority level is used in relation to the allocated amount of communication resources in determining the second priority information to be attached.

A node device according to another embodiment of the present invention has a reception unit for receiving packets each containing a first priority information which is attached at a transmission node, a transmission network, or a management network managing the transmission node or the transmission network and a second priority information which is attached at a previous hop node or a previous hop network, and a transmission unit for transmitting a received packet to a next hop node by rewriting the second priority information into that which indicates the high priority according to the amount of communication resources allocated to a flow to which the received packet belongs, without rewriting the first priority information, when the received packet contains the first priority information indicating the high priority and the second priority information indicating the low priority.

In this way, when an originally high priority packet comes transferred as a low priority packet due to a resource limitation at an upstream side node of the own node, it becomes possible to transfer that packet by setting it back into the high priority packet as long as the resource at the own node permits, by utilizing the information indicating the high priority that is maintained in that packet.

Here, the second priority information may be rewritten from that which indicates the low priority into that which indicates the high priority within a range in accordance with the allocated amount of communication resources, even if it is a packet in which the first priority information indicates the low priority.

It is also possible to write the second priority information indicating the high priority in a packet to be transmitted, at a higher priority for those packets in which the second priority information indicates the high priority over those packets in which the second priority information indicates the low priority, among a plurality of packets in which the first priority information indicates the same priority level, or regardless of what is indicated by the first priority information in packets. This is an example of a way of using the second priority information in determining the priority level at a time of attaching the priority information, in addition to the first priority information or instead of the first priority information.

In this way, a packet that comes transferred as a high priority packet from a previous hop will have a high probability of being transferred as a high priority packet within a range in which the second priority information attached by the own node is valid, which lies on the downstream side of the own node, so that it is possible to increase a possibility by which that packet will be transferred at the high priority end-to-end.

At each node device described above, the first priority information may be attached as determined arbitrarily by the transmission node or the transmission network, or according to an amount of communication resources allocated to a flow to which that packet belongs as determined between the transmission node or the transmission network and the management network for managing the transmission node or the transmission network (which manages communication resources to be used by a packet flowing in from the transmission node or the transmission network).

Note that each node device described above transmits (transfers) a packet in a state of maintaining the first priority information as received, but in the case of the edge router, it is also possible to adopt a configuration which transmits a packet by overwriting the first priority information with the priority information that is determined as described above and attaching another information as the second priority information.

Also, when some node device functions as an edge router with respect to some packet group and as a domain border router with respect to some other packet group, there are cases where a region to which the priority information is to be attached changes or a manner of determining the priority information to be attached changes depending on which function it assumes, so that it is also possible to distinguish a packet group to which a received packet belongs among these packet groups, according to an input interface at which that packet is received, for example. Else, it is also possible to store an address of the transmission node or the transmission network that is to be managed by the own node functioning as an edge router, and function as an edge router when the source address of the received packet coincides with the stored address or as a domain border router otherwise.

Examples described up to here are directed to the case of forming criteria for determining the priority information to be written into a region to which the own node is allowed to write among a plurality of regions in a packet according to the priority information indicated in the received packet or the allocated amount of communication resources, but it is also possible to use the following criteria.

Namely, it is also possible to adopt such criteria that the node device judges whether a packet to be transmitted is a first packet received from a previous hop network (or a first packet which has a node within a network to which the own node belongs as the destination and which is received from a previous hop network) or a second packet which has nodes within a network to which the own node belongs as its source and destination, and transmits to a next hop node a packet which contains the first priority information that was attached by a node other than the own node and that will not be rewritten by the own node and which is attached with the second priority information indicating the high priority as the second priority information that can be rewritten by the own node when the packet is judged as the first packet, or transmits to a next hop node a packet which is attached with the second priority information indicating the low priority as the second priority information that can be rewritten by the own node when the packet is judged as the second packet.

In this way, the packet that is transferred across networks and that is remaining on the network for a long time can be delivered to its destination at a higher priority.

Next, a node device for transferring a packet to which the priority information is attached as described above (which corresponds to a node which does not have a function to attach the priority information by itself and which exists in the network so that it is to carry out the priority control at a time of the packet transfer) will be described. This type of a node device according to the present invention has a reception unit for receiving a packet that contains a first priority information that will not be rewritten after it is attached at a transmission node, a transmission network, or a management network that manages the transmission node or the transmission network, for example, and a second priority information that can be rewritten at a node on a transfer route of that packet, and a processing unit for carrying out a transfer processing of that packet according to the second priority information contained in that packet as received.

For example, a node within some network (domain) through which the packet passes will be carrying out the priority control with respect to that packet according to the second priority information that was attached at an ingress node of that domain (which is valid within that domain). In addition to that, it is also possible to carry out the priority control using the first priority information that was attached at the user level or the edge level and that is maintained within the domain.

In the latter case, the transfer processing of that packet will be carried out at different priority levels depending on whether the first and second priority information contained in that packet as received indicate the high priority, or one of the first and second priority information indicates the high priority while the other one indicates the low priority, or else the first and second priority information indicate the low priority, for example. Depending on the policy within that domain, a packet with the first priority information indicating the high priority and the second priority information indicating the low priority and a packet with the first priority information indicating the low priority and the second priority information indicating the high priority may be treated as the same priority level, or the former may be treated at a higher priority over the latter, or else the latter may be treated at a higher priority over the former.

Note that, in the case where the transmission unit of each node device that attaches the priority information as described above transmits a packet by encapsulating the packet in a lower layer, it is also effective to transmit the packet by encapsulating at least an information corresponding to the second priority information (which is the priority information to be used in the priority control at a node within the network) into a packet header of the lower layer. At this point, the second priority information may or may not be attached to an original packet that is to be encapsulated. In this way, when a node on a route within that network (domain) is a node that carries out the packet exchange by referring to an information contained in the lower layer packet (which carries out the packet transfer without carrying out the assembling into an upper layer packet), that node on the route can carry out the packet exchange (transfer) while carrying out the priority control according to the priority information written in the received lower layer packet.

Moreover, when the transmission unit of each node device that attaches the priority information as described above transmits a packet by encapsulating it in a packet of the same layer (as in the case of IP tunneling), it is also possible to use the received packet containing the first priority information and including its header as a payload of a transmission packet and write the second priority information (the priority information that is used in the priority control at a node within the network) into a specific region in a transmission packet header that is to be newly attached. In this case, a destination to be written into a header to be newly attached will be a next hop domain border router (an egress router of the domain) or a next hop node, for example.

Now, terms used in the following description of the preferred embodiments of the present invention will be explained.

A term "priority bit region" indicates a bit region which is a target of the marking. In the following embodiments, two bits or more of the priority bit region will be necessary overall. The priority bit region will be provided in a packet header but it is not absolutely necessary for every packet to have this priority bit region, so that the priority bit region may be provided in an option header. Also, in the case of using the encapsulation (IP tunneling) which puts an IP packet within another IP packet, a part of the priority bit region will be provided in a header of an original IP packet and another part of the priority bit region will be provided in a packet header that is to be newly attached at a time of the encapsulation.

Bits constituting the priority bit region may not necessarily be located at a continuous region, and can be logical entities so that their physical locations may be changed at each router.

In addition, in the case where a packet is encapsulated in a lower layer packet and the lower layer packet has the priority bit region, a part or a whole of the priority bit region of the original packet (which is preferably a portion to be referred at a node on a route in that network for the purpose of the priority control) may be mapped or copied to the priority bit region of the lower layer packet.

A term "priority class" indicates a set of packets that is classified according to a value in the priority bit region. When the priority bit region has N bits overall, there will be $2^N$ sets of the priority class.

A term "level" indicates a range of a network in which a part of the priority bit region that was marked once will not be rewritten. The level is defined hierarchically and a smaller value for the level implies a wider range for a network. Namely, a range of a network at the level i+1 will be contained within a range of a network at the level i. The following embodiments will be directed to the case of using a packet network in which two or more levels are defined. Examples of the level are as follows.

(1) User level: networks as a whole which are exterior to a transmission terminal of a user.
(2) Edge level: networks as a whole which are exterior from a viewpoint of some network.
(3) Domain level: one autonomously managed network (domain). A domain is a network in which the routing of packets can be carried out using only information of the routing protocol that is operating locally within its interior, in the case of carrying out the packet transfer that is closed within its interior, for example. A network in which one OSPF (Open Shortest Path First) protocol is operating can be a domain. Also, a network magaged by one ISP can be a domain. The present invention is equally applicable to any suitable definition of a domain.
(4) Neighboring node level: a network between two neighboring nodes. A broadcast LAN such as Ethernet can be a neighboring node level.
(5) Intra-node level: an interior of one node.

A term "level i priority bit region" indicates a region of one or more bits in the priority bit region which cannot be rewritten at interior (excluding a border) of a level i network. The priority bit regions of different levels will not overlap. As a consequence, the priority bit region in which a value was written at the user or edge level can maintain that value even when packets pass through a plurality of domains. Note that a router that can rewrite the level i priority bit region is also capable of rewriting the level j ($j \geq i$) priority bit region as well.

A term "packet transfer priority level" indicates the priority level at a time of packet transfer that is determined according to a value of the priority class. The higher priority level implies an ability of being processed at higher priority at a time of packet transfer. One packet transfer priority level may be assigned to one priority class, or the same packet transfer priority level may be assigned to a plurality of priority classes.

The assignment of the packet transfer priority level can be defined globally in an entire packet network, locally within a domain, locally within a subnet, locally within a router, or in any other suitable manner. For example, it is possible to define the mapping such that packets having the same level i priority bit region will have the same packet transfer priority level in the level i network. In this case, it suffices to refer to the level i priority bit region alone at a time of the packet transfer priority control within the level i network (including a border).

A term "packet transfer priority control" indicates the priority control at a time of packet transfer that is carried out according to the packet transfer priority level in routers (not necessarily all routers) within a packet network which adopts the mechanism of the present invention, which includes the scheduling control at a time of packet output and the discarding control at a time of packet arrival.

A term "packet marking priority level" indicates the priority level at a time of marking that is determined according to a value of the priority class. It implies that a packet with a higher packet marking priority level will have a higher probability of being marked as the high priority one than a packet with a lower packet marking priority level, at a time of making the level i priority bit region. One packet marking priority level may be assigned to one priority class, or the same packet marking priority level may be assigned to a plurality of priority classes. Also, the packet marking priority level can be determined independently from the packet transfer priority level.

A term "packet marking priority control" indicates the priority control that is carried out at a time of marking a specified priority bit region (which can be rewritten by that router), and in the case of specifying a maximum amount of communication resources available to a packet that is set with the specified priority bit region indicating the high priority, a packet with a higher packet marking priority level will be marked as the high priority one at higher priority over a packet with a lower packet marking priority level. The marking can be made in units of flows.

More specifically, packets with the low packet marking priority level will be marked as the high priority ones when few packets with the high packet marking priority level arrive, but packets with the low packet marking priority level will be less likely to be marked as the high priority ones than packets with the high packet marking priority level when many packets with the high packet marking priority level arrive.

There are cases where a packet with the low packet marking priority level is marked as the high priority one at some point so that, when a packet with the high packet marking priority level arrives later on, the amount of communication resources available to a packet that is to be set as the high priority one exceeds the maximum amount of communication resources available when packets with the high and low packet marking priority levels are both taken into account, despite of the fact that the amount of communication resources available to a packet that is to be set as the high priority one is less than the maximum amount of communication resources available when packets with the high packet marking priority level alone are taken into account.

In such a case, it is possible to carry out the following control. Namely, a packet with the high packet marking priority level will be marked as the high priority one if the amount of communication resources available to a packet that is to be set as the high priority one is less than or equal to the maximum amount of communication resources available when packets with the high packet marking priority level alone are taken into account. In that case, the amount of communication resources available to a packet that is to be set as the high priority one will exceed the maximum amount of communication resources available when packets with the high and low packet marking priority levels are both taken into account, and while this is case a packet with the low packet marking priority level will not be marked as the high priority one.

In this way, packets with the high packet marking priority level can use a constant amount of communication resources at a time of marking regardless of the presence or absence of packets with the low packet marking priority level.

A term "reference rate for the packet marking priority level i" indicates an amount of communication resources currently used by packets with the packet marking priority level i at a time of carrying out the marking of a specified priority bit region. It is managed such that [reference rate for the packet marking priority level i]≧[reference rate for the packet marking priority level i+1].

Examples of the reference rate for the packet marking priority level i include an input rate of packets with the packet marking priority level higher than or equal to i, and a rate by which packets with the packet marking priority level higher than or equal to i are outputted with a value indicating the high priority in the priority bit region of the specified level (in the case where the priority bit region of the specified level has one bit).

A term "target rate for the packet marking priority level i" indicates a maximum amount of communication resources (allocated amount of communication resources) available to a packet with the packet marking priority level i at a time of carrying out the marking of a specified priority bit region.

The target rate for the packet marking priority level i can be changed dynamically according to an amount of traffic, or can be set to a fixed value during each month or year, or else can be set or changed in any other suitable way.

Examples of the marking that is carried out with respect to the priority bit region of the specified level using the reference rate for the packet marking priority level i and the target rate for the packet marking priority level i are as follows.

One example is a scheme in which the marking value is set to a standard value when the reference rate for the packet marking priority level i and the target rate for the packet marking priority level i are equal, the marking value is set to a higher priority value as the reference rate for the packet marking priority level i becomes smaller compared with the target rate for the packet marking priority level i, and the marking value is set to a lower priority value as the reference rate for the packet marking priority level i becomes larger compared with the target rate for the packet marking priority level i.

Another example is a scheme in which the marking value is set to a higher priority value when the reference rate for the packet marking priority level i is less than or equal to the target rate for the packet marking priority level i, and the marking value is set to a lower priority value when the reference rate for the packet marking priority level i is greater than the target rate for the packet marking priority level i (in the case where the priority bit region of the specified level has one bit).

Note that, by the management such that [reference rate for the packet marking priority level i]≧[reference rate for the packet marking priority level i+1], it becomes possible to realize the packet marking priority control in which packets with the high packet marking priority level are hardly affected by packets with the low packet marking priority level.

Referring now to FIG. 2 to FIG. 17, one embodiment of a node device and a packet transfer method according to the present invention will be described in detail.

Figures 2, 3:
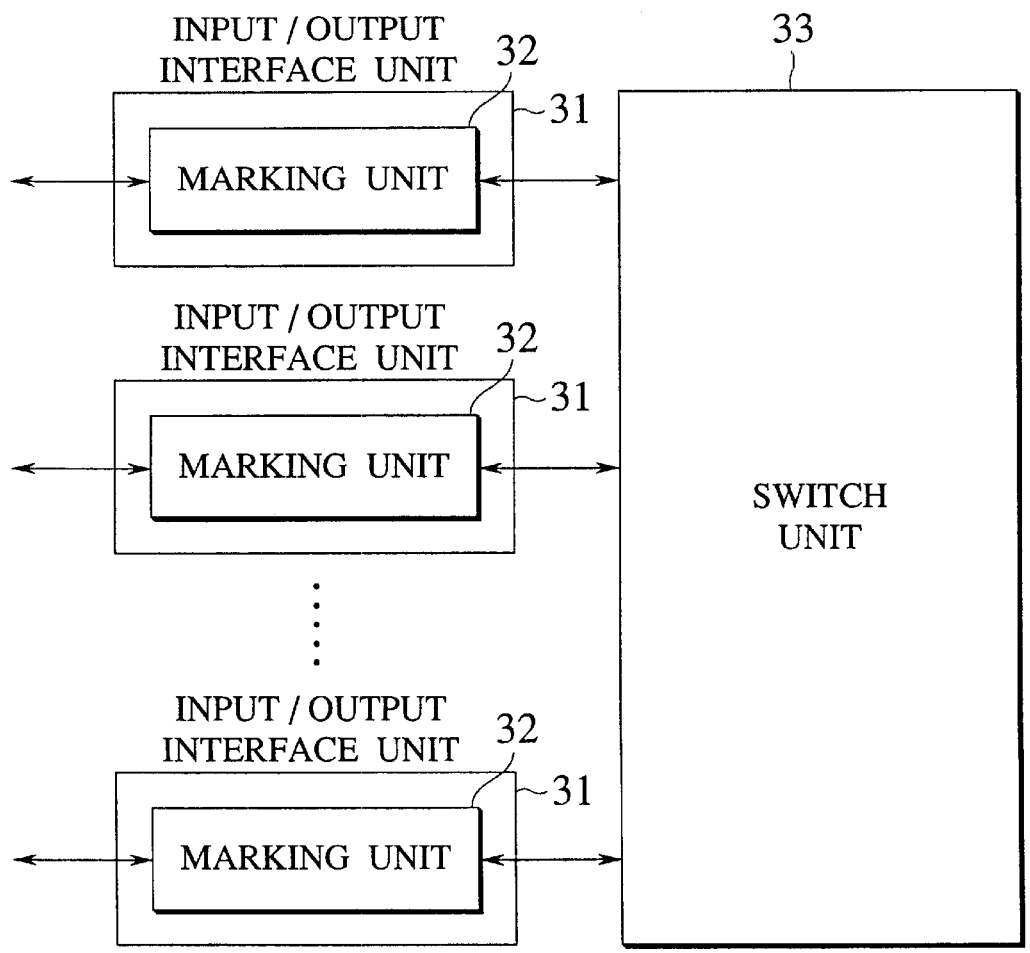
FIG. 2 is a diagram showing an exemplary bit assignment for a priority bit region according to one embodiment of the present invention.
FIG. 3 is a block diagram showing an exemplary configuration of a router according to one embodiment of the present invention.

FIG. 2 shows an exemplary bit assignment for the priority bit region in this embodiment, which is directed to the case where the entire priority bit region has two bits while two hierarchical levels of an edge level (level 1) and a domain level (level 2) are defined and one bit of the priority bit region is assigned to each level.

In FIG. 2, the bit 1 is the edge level priority bit and the bit 2 is the domain level priority bit. In this embodiment, each bit has a value "In" indicating the high priority or a value "Out" indicating the low priority. By combinations of values of the domain level priority bit and the edge level priority bit, four priority classes of "0", "1", "2" and "3" can be defined.

As for the numerical representations of "In" and "Out" values, the case of using "In"="1" and "Out"="0" and the case of using "In"="0" and "Out"="1" are available depending on types of packets, and the present invention is equally applicable to either case. Also, the number of levels can be more than two. In the case of using three levels, for example, it is possible to provide a neighboring router level priority bit for the purpose of carrying out the priority control among a plurality of neighboring routers that are connected to the same broadcast subnet, in addition to the two levels described above.

Packets belongs to one of the four priority classes given by combinations of values of the bit 1 and the bit 2. The mapping between the priority classes and the packet transfer priority levels can be given by any of: (1) Priority level i=Priority class i; (2) Priority level 0=Priority class 0, Priority level 1=Priority class 1 or 2, and Priority level 2=Priority class 3; (3) Priority level 0=Priority class 0 or 1 and Priority level 1=Priority class 2 or 3 (the case of identifying the priority level by the domain level priority bit); (4) Priority level 0=Priority class 0 or 2 and Priority level 1=Priority class 1 or 3 (the case of identifying the priority level by the edge level priority bit); (5) Priority level 0=Priority class 0 or 1, Priority level 1=Priority class 2, and Priority level 2=Priority class 1 or 2 (the case of subdividing the priority level 1 of (3)); and (6) Priority level 0=Priority class 0 or 2, Priority level 1=Priority class 1, and Priority level 2=Priority class 3 (the case of subdividing the priority level 1 of (4)), for example.

Note that it is also possible for the transmitting side user to freely set values of the bit 1 and the bit 2.

Next, FIG. 3 shows an exemplary configuration of a priority information attaching router in this embodiment. This router of FIG. 3 comprises a plurality of input/output interface units 31 having respective marking units 32 for carrying out the marking of the priority bit region in packets, and a switch unit 33 for carrying out packet exchange processing between different input/output interface units 31.

In FIG. 3, the marking unit 32 is provided within the input/output interface unit 31, but it is also possible to provide the marking unit 32 within the switch unit 33. Also, the marking unit 32 carries out the marking with respect to input packets coming in from the external or output packets going out to the external.

Also, the input/output interface unit 31 or the switch unit 33 may be provided with a buffer for storing packets, or with a priority control unit for carrying out the priority control based on the value of the priority bit region in packets.

Note that a router which only carries out the packet transfer priority control and does not carry out the marking will have a configuration in which the marking unit 32 is omitted and a priority control unit is provided within the input/output interface unit 31 or the switch unit 33 in the configuration of FIG. 3.

Next, exemplary manners of marking at the marking unit 32 in the case of a transmitting side edge router will be described with references to FIG. 4 and FIG. 5. The transmitting side edge router is E1 and E2 shown in FIG. 1, for example, and the marking unit 32 here refers to the marking unit provided in the input/output interface unit with respect to each user of E1 and E2.

In FIG. 4 and FIG. 5, "Priority bit" indicates values of the priority bit region for each level before the marking (at a time of packet input to the marking unit 32) and after the marking (at a time of packet output from the marking unit 32). An entry with the priority bit after the marking indicated as "In/Out" denotes that it is marked as either "In" or "Out" depending on the marking algorithm.

"Packet marking priority level (i)" indicates the priority level at a time of marking which is defined by values of the priority bit region before the marking, and which can be defined independently from the packet transfer priority level. The higher packet marking priority level implies the likelihood of packets being marked as "In" at higher priority.

"Reference rate (m[i])" indicates an output rate of packets that are marked as "In" with respect to packets belonging to each packet marking priority level, and this value will be utilized at a time of marking packets as "In" or "Out". Note that the reference rate is set such that $m[i] \geq m[i']$ with respect to any two packet marking priority levels i and i' where i<i'.

"Target rate (r[i])" indicates the target rate for each packet marking priority level (a threshold for the reference rate at a time of marking), where packets will be marked as "Out" when the packet marking reference rate exceeds the packet marking target rate.

Both FIG. 4 and FIG. 5 show examples in which the transmitting side edge router sets the priority bit 2 as "Out".

In FIG. 4, the edge router rewrites the priority bit 1 of a packet with the priority bit 1="In" into "In" or "out" using a rate of output packets with the priority bit 1="In" from the user as the reference rate and ELR as the target rate. The priority bit 1 of a packet with the priority bit 1="Out" will remain as "Out".

In FIG. 5, the edge router rewrites the priority bit 1 into "In" even for a packet with the priority bit 1="Out" from the user when the output rate of packets with the priority bit 1="In" is smaller than ELR. In this example, the packet marking priority level is determined by the value of the priority bit 1 of the input packet (the priority bit 1="In" is the higher packet marking priority level), and a rate of output packets with the priority bit 1="In" is used as the reference rate for the packet marking priority level=0 while a rate of output packets with the priority bit 1="In" with respect to input packets with the priority bit 1="In" is used as the reference rate for the packet marking priority level=1. The target rate is ELR for both the packet marking priority level=0 and 1.

Next, exemplary manners of marking at the marking unit 32 in the case of a domain border router will be described with references to FIG. 6 and FIG. 12. The domain border router is B2, B5 and B6 shown in FIG. 1, for example, and the marking unit 32 here refers to the marking unit provided in the input/output interface unit of B2, B5 and B6 with respect to B1, B3 and B4, respectively. Note that B1, B3 and B4 shown in FIG. 1 may function as this domain border router.

FIG. 6 shows an exemplary case in which the priority bit 2 of an input packet with the priority bit 1="In" is rewritten into "In" or "Out", and the priority bit 2 of an input packet with the priority bit 1="Out" is set as "Out". In this example, the packet marking priority level is determined by the value of the priority bit 1 of the input packet (the priority bit 1="In" is the higher packet marking priority level), and a rate of output packets with the priority bit 2="In" is used as the reference rate for each packet marking priority level. The target rate for the packet marking priority level=0 is 0, that is, the priority bit 2 is set as "Out" always. The target rate for the packet marking priority level=1 is DLR.

FIG. 7 shows an exemplary case In which the priority bit 2 of an input packet with the priority bit 1="In" is rewritten into "In" or "Out", and the priority bit 2 of an input packet with the priority bit 1="Out" is set as "In". In this example, the packet marking priority level is determined by the value of the priority bit 1 of the input packet (the priority bit 1="In" is the higher packet marking priority level), and a rate of output packets with the priority bit 2="In" is used as the reference rate for each packet marking priority level. The target rate for the packet marking priority level=∞ (infinity), that is, the priority bit 2 is set as "In" always. The target rate for the packet marking priority level=1 is DLR.

Note that in FIG. 6 and FIG. 7, the packet transfer priority level is determined as follows, for example.

A packet with the priority bit 1="In" has a higher packet transfer priority level than a packet with the priority bit 1="Out" regardless of the value of the priority bit 2. Also, among packets with the priority bit 1="In", a packet with the priority bit 2="In" has a higher packet transfer priority level than a packet with the priority bit 2="Out". All packets with the priority bit 1="Out" have the same packet transfer priority level regardless of the value of the priority bit 2. In other words, they correspond to the cases of setting Priority level 0=Priority class 0 (the case of FIG. 6) or 2 (the case of FIG. 7), Priority level 1=Priority class 1, and Priority level 2=Priority class 3 in FIG. 2.

Here, the cases of FIG. 6 and FIG. 7 differ from each other in that the priority bit 2 of a packet with the priority bit 1="Out" is to be always set as "Out" (the case of FIG. 6) or "In" (the case of FIG. 7), but they share the common feature of attaching the priority bit 2 (while leaving the priority bit 1 unchanged) such that the packet transfer priority level within the domain becomes low for an input packet that is indicated as the low priority one, and attaching the priority bit 2 (while leaving the priority bit 1 unchanged) such that the packet transfer priority level becomes medium or high depending on the traffic condition for an input packet that is indicated as the high priority one.

FIG. 8 shows an exemplary case in which an input packet with the priority bit 1="In" is marked at higher priority over an input packet with the priority bit 1="Out", at a time of carrying out the marking of the priority bit 2. In this example, the packet marking priority level is determined by the value of the priority bit 1 of the input packet (the priority bit 1="In" is the higher packet marking priority level), and a rate of output packets with the priority bit 2="In" is used as the reference rate for the packet marking priority level=0 while a rate of output packets with the priority bit 1="In" with respect to input packets with the priority bit 1="In" is used as the reference rate for the packet marking priority level=1. The target rate is DLR for both the packet marking priority level=0 and 1.

FIG. 9 shows an exemplary case in which an input packet with the priority bit 1="In" is always marked as the priority bit 2="In", and an input packet with the priority bit 1="Out" is marked as the priority bit 2="In" when the output rate of packets with the priority bit 2="In" is smaller than DLR, at a time of carrying out the marking of the priority bit 2. In this example, the packet marking priority level is determined by the value of the priority bit 1 of the input packet (the priority bit 1="In" is the higher packet marking priority level), and a rate of output packets with the priority bit 2="In" is used as the reference rate for each packet marking priority level. The target rate for the packet marking priority level=0 is DLR, while the target rate for the packet marking priority level=1 is ∞ (infinity), that is, the priority bit 2 is set as "In" always.

Note however that in this case it is preferable to limit the total amount of input packets with the priority bit 1="In" to be less than or equal to DLR, by limiting subscriptions with the users for example, so that the sum of ELRs within the domain becomes less than or equal to DLR.

FIG. 10 shows an exemplary case of carrying out the marking using not only the value of the priority bit 1 but also the value of the priority bit 2 of the input packet, at a time of carrying out the marking of the priority bit 2. The packet marking priority level is set such that an input packet with the priority bit 1="In" becomes a higher priority one, and an input packet with the priority bit 2="In" becomes a higher priority one among those input packets which have the same value for the priority bit 1.

In this case, a rate of output packets with the priority bit 2="In" is used as the reference rate for the packet marking priority level=0 while a rate of output packets with the priority bit 2="In" with respect to input packets with the priority bit 1="In" or the priority bit 2="In" is used as the reference rate for the packet marking priority level=1. Also, a rate of output packets with the priority bit 2="In" with respect to input packets with the priority bit 1="In" is used as the reference rate for the packet marking priority level=2 while a rate of output packets with the priority bit 2="In" with respect to input packets with the priority bit 1=the priority bit 2="In" is used as the reference rate for the packet marking priority level=3. The target rate is DLR for each packet marking priority level.

FIG. 11 shows another exemplary case of carrying out the marking using not only the value of the priority bit 1 but also the value of the priority bit 2 of the input packet, at a time of carrying out the marking of the priority bit 2, similarly as in the case of FIG. 10. This case of FIG. 11 however differs from the case of FIG. 10 in that the packet marking priority level is set such that an input packet with the priority bit 2="In" becomes a higher priority one, and an input packet with the priority bit 1="In" becomes a higher priority one among those input packets which have the same value for the priority bit 2.

In this case, the reference rates for the packet marking priority level=0, 1 and 3 are the same as in the case of FIG. 10, while a rate of output packets with the priority bit 2="In" with respect to input packets with the priority bit 2="In" is used as the reference rate for the packet marking priority level=2. The target rate is DLR for each packet marking priority level.

Note that FIG. 10 and FIG. 11 show exemplary cases where the packet marking priority level of an input packet with the priority bit 2="In" is set higher than that of an input packet with the priority bit 2="Out", but this relationship may be reversed depending on the operation policy of the network.

FIG. 12 shows an exemplary case of giving higher priority to inter-domain traffic over intra-domain traffic. Here, the priority bit 2="In" is set for an input packet received from the other domain unconditionally (or if the destination of that input packet is within the own domain). In this way, it becomes possible for the output side domain to treat traffic that is flowing in from the other domain at higher priority over traffic that is closed within the domain. This scheme is effective in the application such as TCP which carry out such a flow control that a throughput of a session for which the transmission delay is large in the usual network becomes smaller than a throughput of a session for which the transmission delay is small in the usual network.

In the examples described up to now, the priority bit 1 is set as "In" or "Out" by the user and the edge router and the priority bit 2 is set as "In" or "Out" by the domain border router, but it is also possible to use a provision in which the priority bit 1 is set as "In" or "Out" by the user and the priority bit 2 is set as "In" or "Out" by the edge router or the domain border router. It is also possible to use a provision for providing the priority bit region with three bits in correspondence to the user level, the edge level and the domain level.

Figure 13:
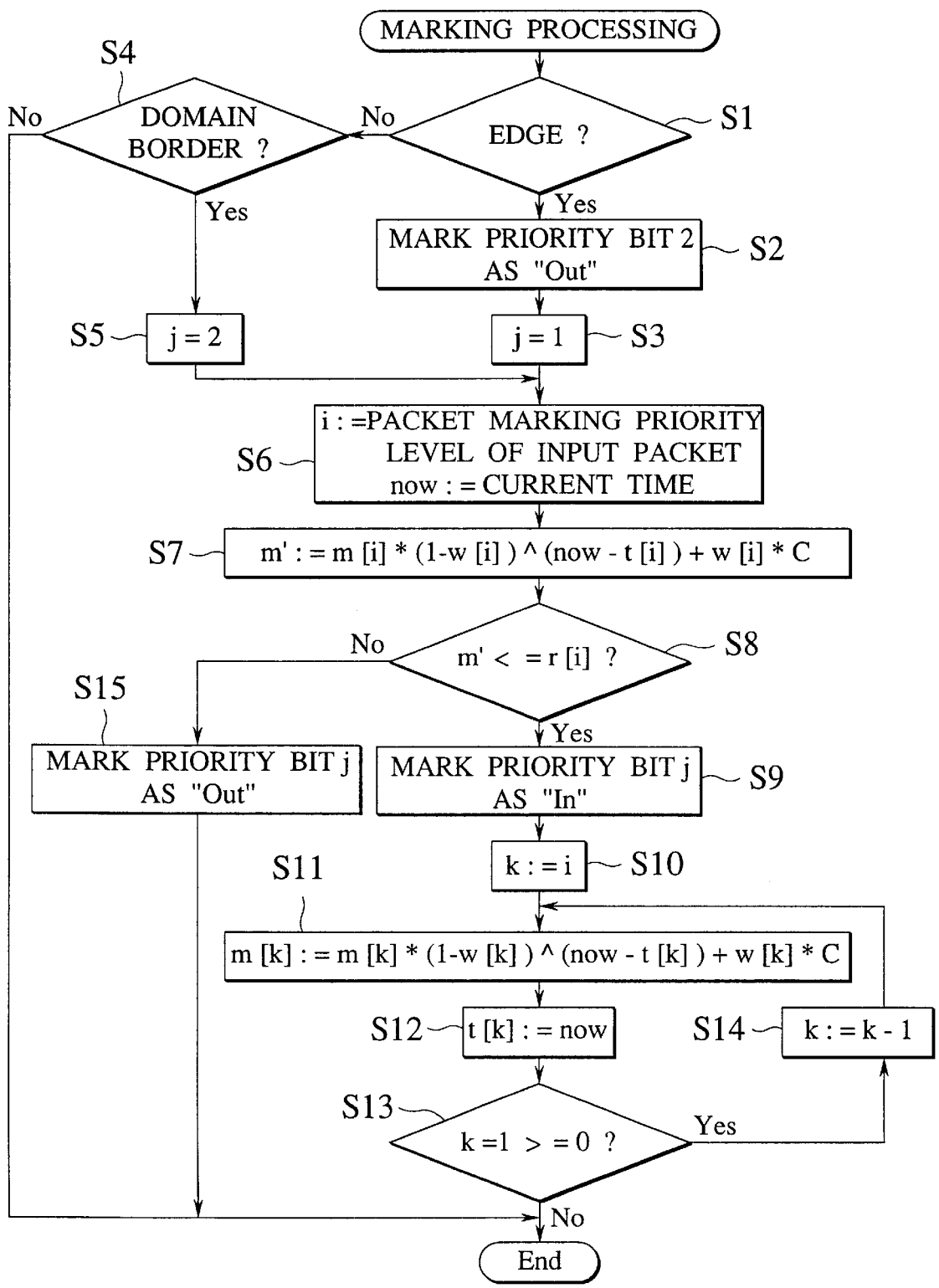
FIG. 13 is a flow chart for an exemplary marking algorithm according to one embodiment of the present invention.

Next, the marking algorithm to be executed by the marking unit 32 in this embodiment will be described with reference to FIG. 13. In FIG. 13, "j" denotes a position of the priority bit corresponding to the priority level, "m[i]" denotes the packet marking reference rate for the packet marking priority level i (with the initial value=0), and "r[i]" denotes the packet marking target rate for the packet marking priority level i. Also, "t[i]" denotes a final time at which the output of packets with the packet marking priority level higher or equal to i after marking the priority bit j="In" is completed (with the initial value=0), "C" denotes a link capacity, and "w[i]" is a smoothing parameter for "m[i]".

The marking unit 32 has either a state of carrying out the edge level marking or a state of carrying out the domain level marking. In the case of carrying out the edge level marking (where the own node functions as the edge router) upon having a packet entered into the marking unit 32 (step S1 YES), the priority bit 2 is marked as "Out" (step S2) and j is set to 1 (step S3). When this is done, the inter-domain traffic with the priority bit 2 set as "In" according to FIG. 12 will be transferred at higher priority within the domain over packets with the priority bit 2 marked as "Out" which are still the intra-domain traffic at this point, for example. Note that the priority bit 2 may be marked as "In" at a time of carrying out the edge level marking, contrary to what is described above, depending on the operation policy of the domain.

On the other hand, in the case of carrying out the domain level marking (where the own node functions as the domain border router) (step S4 YES), j is set to 2 (step S5). Then, the packet marking priority level is determined from the value of the priority bit region of the input packet and set equal to "i", while the current time at a time of the packet input is set equal to "now" (step S6).

Next, the reference rate m after the marking is calculated by assuming that the priority bit j of the input packet is marked as "In" with respect to the packet marking priority level i (step S7). Then, if m≦the target rate r[i] (step S8 YES), the priority bit j is marked as "In" (step S9), whereas otherwise (step S8 NO) the priority bit j is marked as "Out" (step S15).

When the priority bit j is marked as "In", the update of the reference rate m[k] and the update of the final marking time t[k] are carried out for the packet marking priority level k (i≧k≧0) (steps S10 to S14). The reference rate m[k] is updated according to an exponential moving average of the smoothing parameter w[k]. Here however m[k] is to be updated only at a time of packet output so that (1−w[k]) must be exponentiated by the elapsed time (now−t[k]) since the previous packet output time. By updating the reference rate m[k] with respect to each packet marking priority level k which is less than or equal to i in this manner, it becomes possible to mark a packet with the high packet marking priority level as "In" at higher priority over a packet with the low packet marking priority level.

Next, an exemplary configuration of the marking unit 32 for realizing the marking algorithm of FIG. 13 will be described with reference to FIG. 14.

Figure 14:
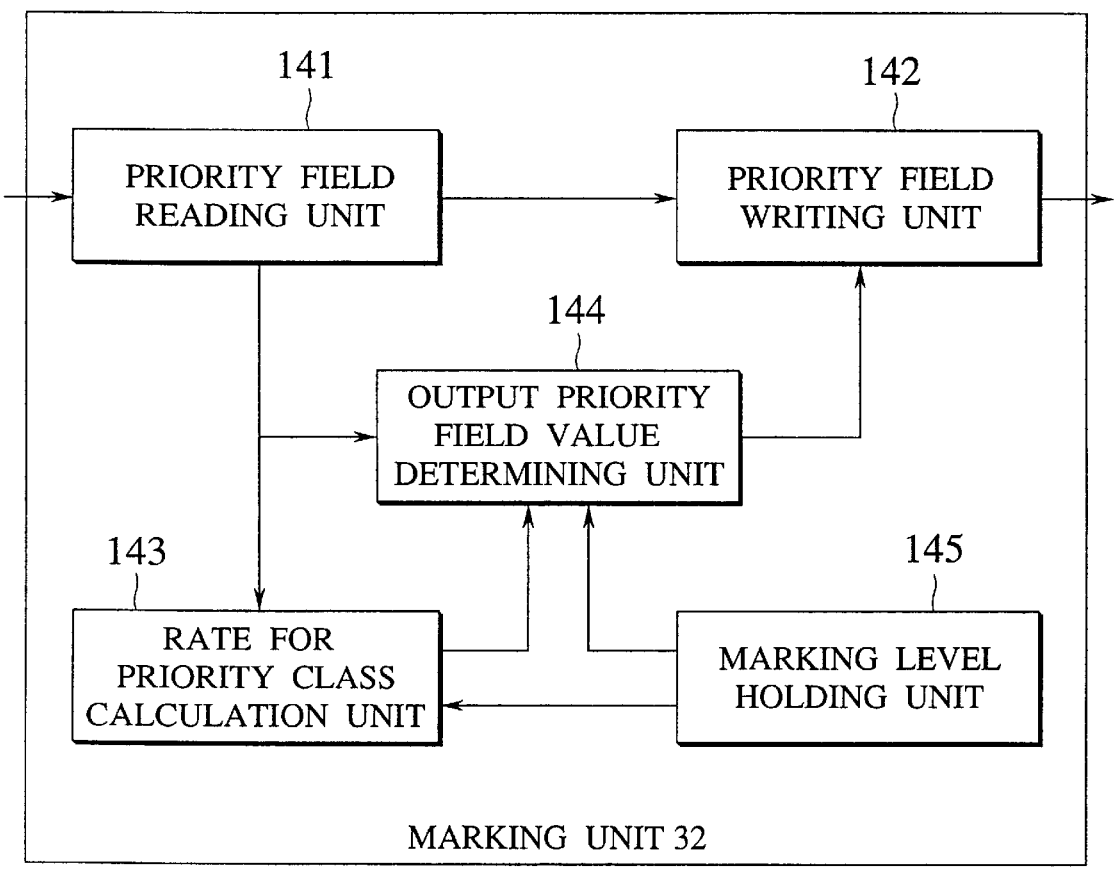
FIG. 14 is a block diagram showing an exemplary configuration of a marking unit in the router according to one embodiment of the present invention.

The marking unit 32 of FIG. 14 comprises a priority field reading unit 141, a priority field writing unit 142, a rate for priority class calculation unit 143, an output priority field value determining unit 144, and a marking level holding unit 145.

An input packet of the marking unit 32 is entered into the priority field reading unit 141.

The priority field reading unit 141 copies the priority level recorded in the priority field in the packet header and outputs it to the output priority field value determining unit 144 and the rate for priority class calculation unit 143, while giving the input packet to the priority field writing unit 142.

The marking level holding unit 145 holds a marking level information indicating a level of the marking to be carried out at this node. Here, the marking level information specifies any one of "edge level" indicating that the edge level marking is to be carried out, "domain level" indicating that the domain level marking is to be carried out, and "no level" indicating that no marking is to be carried out.

The rate for priority class calculation unit 143 carries out the updating of the packet arrival rate with respect to each priority class for which the rate updating is necessary, from the priority information given from the priority field reading unit 141 and the marking level information given from the marking level holding unit 145.

The output priority field value determining unit 144 determines the output priority field value, from the priority information given from the priority field reading unit 141, the packet arrival rate for each priority class calculated by the rate for priority class calculation unit 143, and the marking level information held by the marking level holding unit 145.

The priority field writing unit 142 writes the priority field value determined by the output priority field value determining unit 144 into a header section of the packet given from the priority field reading unit 141, and outputs this packet from the marking unit 32.

Examples described up to now are directed to the case where ELR is a subscription rate between the user and the domain to which the user is connected while DLR is a subscription rate between two neighboring domains. Now, the case of using ELR specific to each destination and DLR specific to each neighboring domain border router will be described with reference to FIG. 15.

Figure 15:
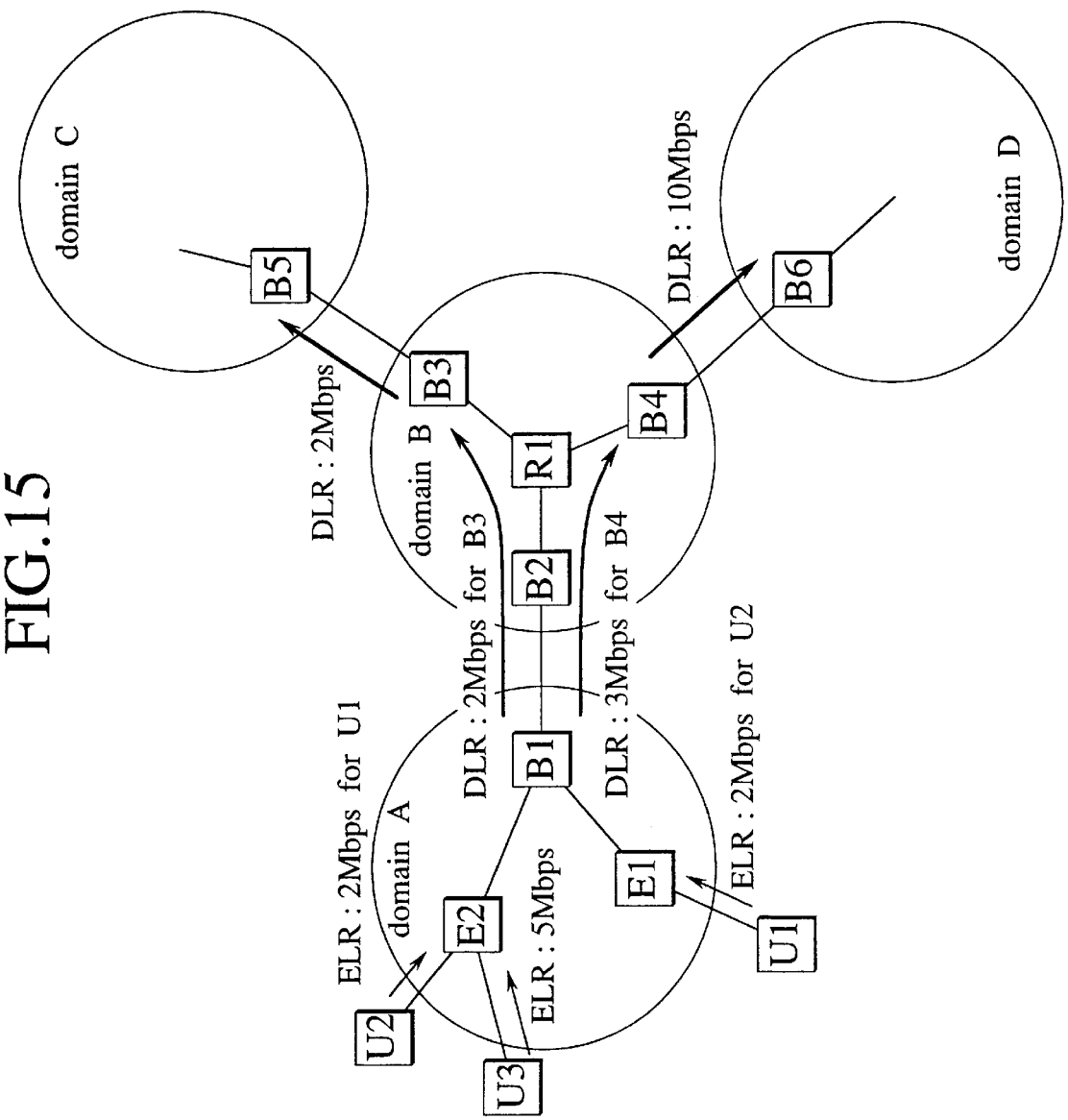
FIG. 15 is a diagram showing a network in the case of specifying destination specific ELR and neighboring domain border router specific DLR according to one embodiment of the present invention.

In the example of FIG. 15, the user U1 in the domain A specifies ELR=2 Mbps with respect to packets destined to the user U2 in the same domain A. In addition, the user U2 also specifies ELR=2 Mbps with respect to packets destined to the user U1. This is effective when the users U1 and U2 belong to the same intra-company network and wish to provide the high QoS only with respect to traffic between the users U1 and U2. Note that ELR=0 Mbps will be set with respect to packets with destinations other than the specified destinations. Also, one user may specify a plurality of ELRs individually with respect to a plurality of destinations.

Also, the domain B carries out the marking using DLR of 5 Mbps overall with respect to incoming traffic from the domain A similarly as in FIG. 1, but in the example of FIG. 15, among these 5 Mbps of DLR, the marking based on DLR of 2 Mbps is carried out with respect to traffic for which the next hop domain border router is B3 while the marking based on DLR of 3 Mbps is carried out with respect to traffic for which the next hop domain border router is B4. Note that the next hop domain border router through which a packet passes can be searched out from the destination of the packet by accessing data structure managed by the inter-domain routing protocol, for example.

In the case of FIG. 1, when 5 Mbps of packets destined to the domain C from the domain A flow into the domain B, these packets will be treated as the high priority packets at the domain level within the domain B, but DLR between the domains B and C is 2 Mbps so that the marking for treating only 2 Mbps out of 5 Mbps as the high priority packets at the domain level within the domain C will be carried out at the domain border router B5 or B3.

On the other hand, in FIG. 15, the domain border router B2 marks only 2 Mbps of traffic as the high priority ones with respect to packets for which the next hop domain border router is B3, because only 2 Mbps can be expected to be treated as the high priority packets at the domain level within the domain C. Consequently, the remaining bandwidth becomes available for use by the low priority packets at the domain level within the domain B.

As such, by specifying DLR (allocating communication resources) in finer units, it becomes possible to share the bandwidth more effectively among the high priority packets and the low priority packets.

Note that, in the case of specifying ELR or DLR by specifying correspondent while routers within the domain have ATM switching functions, it is possible to set up label switching paths (cut-through paths) of ATM or short-cut paths based on NHRP (Next Hop address Resolution Protocol) by specifying the bandwidth corresponding to ELR or DLR at a peak rate or an average rate as the traffic parameter at a time of ATM signaling among the edge routers or the domain border routers.

Also, each router can map one bit in the priority bit region to a CLP (Cell Loss Priority) bit of the ATM cell. In this case, it is also possible to use a UPC (Usage Parameter Control)

unit in a UNI (User Network Interface) of ATM as the marking unit with respect to the priority bit that is mapped to the CLP bit.

Finally, FIG. 16 and FIG. 17 show exemplary cases of applying the priority bit region of this embodiment to packets of IP version 4 (IPv4) and IP version 6 (IPv6), respectively.

In FIG. 16 and FIG. 17, the number inside brackets indicates the bit length of each field. In the IPv4 packet, at least two bits from three bits of Precedence field and Five bits of TOS field (portions enclosed by bold lines in FIG. 16) can be used as the priority bit region. In the IPv6 packet, at least two bits from eight bits of Traffic Class field (a portion enclosed by bold lines in FIG. 17) can be used as the priority bit region.

As described, according to the present invention, it becomes possible to attach the priority information hierarchically according to respective ranges of the network in which packets are to be transferred, so that it becomes possible to realize a flexible priority control in the packet transfer.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A node device, comprising:

a reception unit configured to receive packets each having a plurality of regions into which priority information can be written; and a transmission unit configured to transmit each packet received by the reception unit to a next hop node by writing the priority information according to criteria of said node device into one region into which said node device is allowed to write the priority information among the plurality of regions contained in each packet, while maintaining any of the priority information already written in other regions as received.

2. The node device of claim 1, wherein the transmission unit determines the priority information to be written into said one region by said node device according to a priority level specified by one or a combination of plural of the priority information written in the plurality of regions contained in each packet received by the reception unit.

3. The node device of claim 2, wherein the transmission unit determines the priority information to be written into said one region by said node device such that an amount of communication resources to be used by selected packets, which are to be transmitted by writing the priority information indicating a high priority into said one region, will approach an amount of communication resources allocated to a set of packets to which said selected packets belong.

4. A packet transfer method at a node, comprising the steps of:

receiving packets each having a plurality of regions into which priority information can be written; and transmitting each packet received by the receiving step to a next hop node by writing the priority information according to criteria of said node into one region into which said node is allowed to write the priority information among the plurality of regions contained in each packet, while maintaining any of the priority information already written in other regions as received.

* * * * *